(12) United States Patent
Maloney

(10) Patent No.: US 6,453,169 B1
(45) Date of Patent: *Sep. 17, 2002

(54) PORTABLE RADIOTELEPHONE WITH MULTIPLE FUNCTION POWER KEY

(75) Inventor: John E. Maloney, San Diego, CA (US)

(73) Assignee: Qualcomm Incorporated, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/808,623

(22) Filed: Feb. 28, 1997

(51) Int. Cl.[7] .............................. H04B 1/38; H04M 1/00
(52) U.S. Cl. ......................... 455/550; 455/90; 455/567
(58) Field of Search ........................ 455/90, 575, 567, 455/572, 550, 128, 347, 357, 348, 349; 329/433, 434

(56) References Cited

U.S. PATENT DOCUMENTS

| | | | | |
|---|---|---|---|---|
| 4,378,551 A | * | 3/1983 | Drapac .................... 340/311.1 |
| 4,426,157 A | * | 1/1984 | Jetter ........................... 368/73 |
| 4,591,661 A | * | 5/1986 | Benedetto et al. ............. 179/2 |
| 5,201,068 A | | 4/1993 | Kawashima ................. 455/89 |
| 5,212,811 A | | 5/1993 | Kuge et al. .................... 455/73 |
| 5,404,578 A | | 4/1995 | Kuge et al. .................... 455/73 |
| 5,542,103 A | * | 7/1996 | Mottier et al. ............... 455/413 |
| 5,548,832 A | | 8/1996 | Karam .................... 455/226.4 |
| 5,657,372 A | * | 8/1997 | Ahlberg et al. ............. 455/567 |
| 5,689,824 A | * | 11/1997 | Nagai ........................... 455/90 |
| 5,761,610 A | * | 6/1998 | Sorensen et al. ............. 455/89 |

FOREIGN PATENT DOCUMENTS

| | | | | |
|---|---|---|---|---|
| EP | 0647037 | 4/1995 | ............ H04B/1/38 |
| EP | 0719022 | 6/1996 | ............ H04M/1/72 |
| JP | 4-111655 | * | 4/1992 | |

* cited by examiner

Primary Examiner—Nguyen Vo
(74) Attorney, Agent, or Firm—Russell B. Miller; Charles D. Brown; Roger W. Martin

(57) ABSTRACT

A communication device including a power key located on an outer surface of the housing which may provide multiple functions, but is resistant to initiation of undesired handset functions. Control circuitry within the communication device may be configured to ignore any actuation of the power key with a duration less than a determined time period. The control circuitry performs a first function if the power key is depressed for a first duration, and performs a second function when the power key is depressed for a second duration. For example, depression of the power key for a short period of time may silence and incoming call alert, whereas depression of the power key for a longer period of time will turn the communication device on or off.

2 Claims, 6 Drawing Sheets

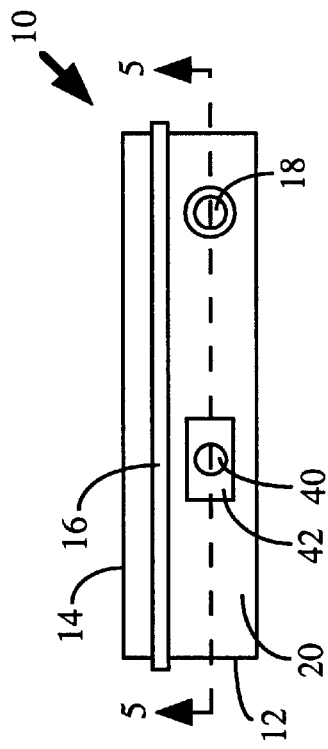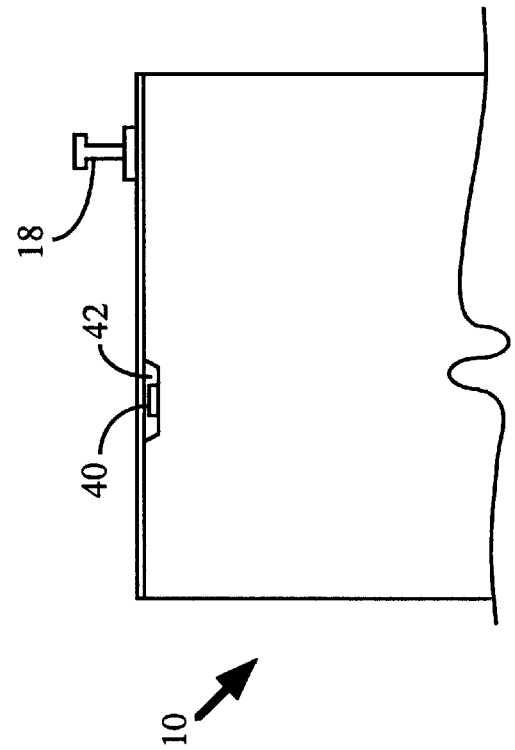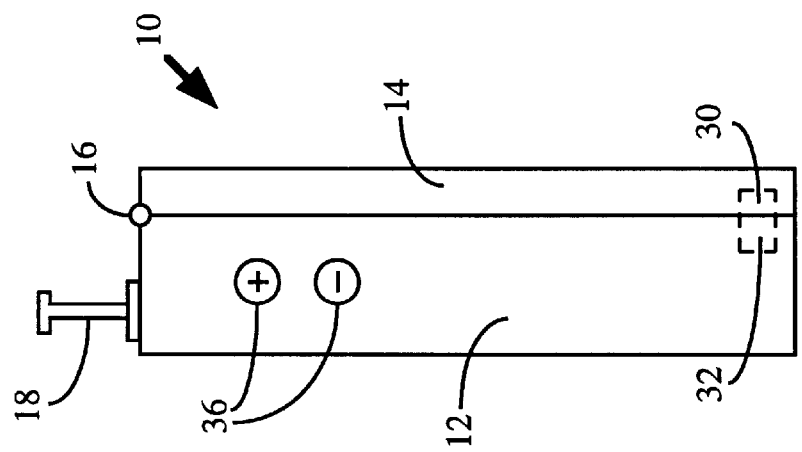

PORTABLE RADIOTELEPHONE WITH MULTIPLE FUNCTION POWER KEY

BACKGROUND OF THE INVENTION

I. Field of the Invention

The present invention relates to portable communication devices such as wireless telephones. More particularly, the present invention relates to a novel and improved portable communication device having an exposed and multifunctional power on/off key.

II. Description of the Related Art

Wireless telephony has become increasingly popular with the general population as costs continue to decrease and service providers continue to expand the nature of the services they provide as well as their geographical coverage. Another aspect of the recent development of wireless telephones which has encouraged their increasing popularity are the tremendous reductions in size and weight, and hence portability, of the telephone handset. This allows the handset to be carried by the user in many convenient locations such as a purse, automobile glove compartment, or jacket pocket. Unfortunately, however, such widespread consumer use and ease of portability leads inevitably to an increase in careless handling and storage of the telephone handset. It is preferable, therefore, for telephone handsets to be made to withstand this careless handling without operating in an undesired fashion.

It can be appreciated that one type of undesirable behavior which a portable telephone handset can exhibit is an inadvertent keypad actuation when the handset is stored. This can lead to accidentally turning the handset on or off, initiating a telephone call or the transmission of other undesired signals, or the performance of electronic functions the user does not actually wish to perform. One serious consequence of such undesired actuation is the premature draining of the handset battery.

Several telephone handset designs have been used or suggested in order to minimize this problem. For example, many of the recently introduced cellular telephone handsets are made to be foldable so that their size can be reduced to as small as possible when the handset is not in use. In the "flip-phone" described in U.S. Pat. No. 4,845,772 to Metroka, et al., for example, the handset keypad, including the on/off button, is covered by the foldable flip portion of the handset when the handset is stored. While it can be appreciated that simply covering the buttons with the flip will provide some protection from inadvertent button actuation, the device described in the Metroka patent disables operation of the on/off switch when the flip is closed. This prevents actuation of the on/off switch when the flip is closed even when a foreign object such as a coin or paper clip is accidentally closed in under the flip.

Devices such as those described in the Metroka et al. patent have at least one significant drawback. It is often convenient for a user to be able to turn the telephone handset on or off without opening the flip portion. This is impossible with the Metroka et al. device. It may be noted that even if the on/off button were accessible with the flip closed, the on/off disable feature of the Metroka et al. device would still require the user to open the flip in order to turn the telephone on or off.

Other functions are also convenient to have available to a user without opening a flip. For example, when an incoming call is received, the user may wish to silence the incoming call alert, and have the call go unanswered, be forwarded to a voice-mail service, or be processed in some other manner defined by the user. It is preferable in this case for the user to be able to silence the alert without opening the flip.

Thus, a need exists for a portable telephone handset which resists inadvertent button actuation, while at the same time allows easy access to certain features which are convenient for the user to be able to utilize quickly and easily.

SUMMARY OF THE INVENTION

The present invention is a novel and improved communication device which may advantageously comprise a wireless telephone handset. The improved handset may include a housing and an on/off switch located on an outer surface of the housing wherein the on/off switch is accessible to a user. In some embodiments of the present invention, a key of the handset can include features which may help resist initiation of undesired handset functions. Accordingly, one embodiment of the present invention comprises a portable communication apparatus comprising an on/off switch and a control circuit coupled to the on/off switch. The control circuit may be configured to control the on/off state of circuitry in the portable communication apparatus. Furthermore, the control circuitry may be configured to ignore any actuation of the on/off switch with a duration less than a determined time period.

Embodiments of the present invention also include a wireless telephone comprising a key coupled to control circuitry, wherein the control circuitry is configured to perform a first function if the key is depressed for a first duration, and is configured to perform a second function when said key is depressed for a second duration. The present invention further encompasses methods for operating communication devices. For example, one embodiment of the present invention includes a method of controlling the state of a cellular telephone handset comprising the steps of determining a time of depression of a key on the cellular telephone handset, and maintaining a current state of the cellular telephone handset when the time of depression of the key is less than a selected time period.

The present invention may be implemented in a communication device having a multiple function keyswitch. The communication device comprises at least a power key, and a control circuit, coupled to the power key, for sensing an actuation of the power key, and for silencing an alert in response to the actuation of the power key if a duration of the actuation is greater than a first predetermined time period, and for powering said communication device on or off if the duration of the actuation is greater than a second predetermined time period.

The communication device may further comprise a body portion having a front surface, a back surface, and a top surface, with the front surface having a user interface thereon, and the power key disposed on the top surface. Additionally, the communication device may comprise a moveable flip portion secured to the body portion by a hinge at the top surface of the body portion. Optionally, the communication device of Claim 2 wherein said power key is disposed in a recessed portion of said top surface of said body portion to provide even greater resistance to inadvertent actuation. In one embodiment, the moveable flip portion covers the user interface when in a closed position, and the power key remains exposed when the moveable flip portion is in said closed position.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a side plan view of the cellular telephone handset of FIG. 1 with the flip closed;

FIG. 4 is a top plan view of the cellular telephone handset of FIG. 3;

FIG. 5 is a cutaway view along lines 5—5 of the cellular telephone handset of FIG. 4;

DETAILED DESCRIPTION OF THE PREFERRED EMBODIMENTS

Figure 1:
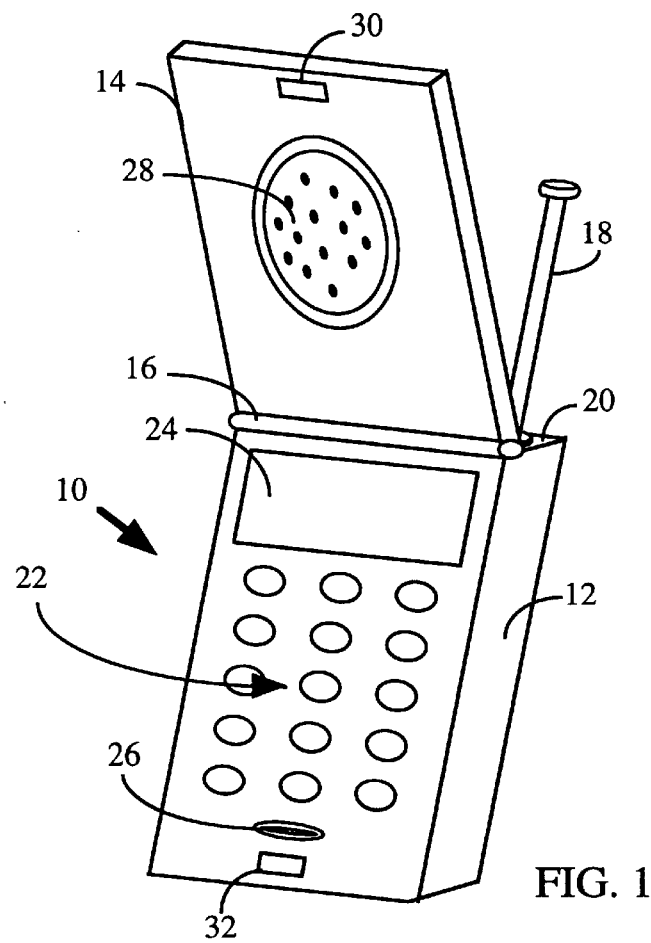
FIG. 1 is a perspective view of a cellular telephone having an open hinged flip.

Referring now to FIG. 1, a communication device, which in this specific embodiment comprises a wireless telephone handset 10, is illustrated. The handset 10 may comprise a body portion 12 and a flip portion 14. The body portion 12 and flip portion 14 may further be coupled by a hinge 16. A handset 10 which includes such a hinged flip is often referred to as a "flip-phone". The foldable nature of such a handset 10 renders storage rather convenient for the user, because the handset can be folded up into a small package and carried in a pocket, purse, etc. The handset 10 of FIG. 1 also includes an antenna 18, extending from one surface 20 of the handset 10. Antenna 18 can be made retractable or fixed as is known in the art. Several other standard wireless telephone handset features are also illustrated in FIG. 1. These include a keypad 22, a display 24, and a microphone 26. Furthermore, the flip portion 14 may additionally comprise an earpiece 28. It should be noted that keypad 22 may also be another type of user interface such as a touch-sensitive screen or other userinterface as is known in the art.

In some embodiments of the present invention, the flip portion 14 includes a first portion 30 of an actuator, which has a mating second portion 32 on the body 12. As will be explained in more detail below with reference to FIGS. 9 and 10, the actuator comprising first portion 30 and second portion 32 can be used to alter the handset 10 response to various user commands. The actuator may be a mechanically actuated reed switch, a magnet and a hall effect switch, or may comprise other flip actuator mechanisms known to those in the art. One such alternative is described in U.S. Pat. No. 5,175,759 to Metroka et al., wherein the actuator and hookswitch is located within the hinge 16 itself. It should be noted that the present invention is not limited to the type of switching mechanism used for the actuator, and that any type of switching as is known in the art, whether or not fully contained within hinge portion 16, may be used in place of first portion 30 and second portion 32 as illustrated in FIG. 1. However, for clarity and simplicity, FIG. 1 is illustrated with an actuator comprising first portion 30 and second portion 32.

Figure 2:
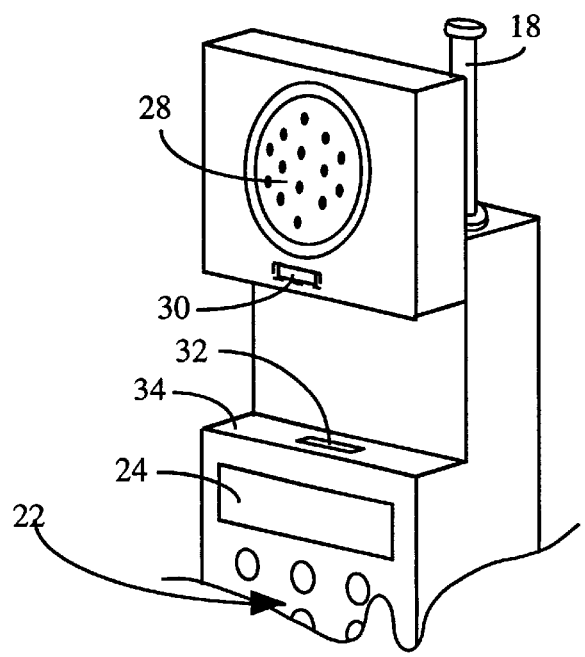
FIG. 2 is a perspective view of a cellular telephone handset having a moveable earpiece.

An alternative embodiment of a wireless telephone handset is illustrated in FIG. 2. This embodiment also includes an antenna 18, a keypad 22, and a display 24. Rather than having a hinged flip 14 (see FIG. 1), however, this alternative embodiment incorporates a sliding earpiece 28, which is extended upward during use of the handset. In this embodiment, the actuator first portion 30 can be provided in the bottom surface of the earpiece 28, and can mate with the second portion 32 of the actuator in an upper horizontal surface 34 of the body of the handset. Alternatively, the actuator in FIG. 2 may be hidden behind the earpiece 28 and may comprise other switching mechanisms as are known in the art. Again, it should be noted that present invention is not limited to the type of switching mechanism used for the actuator, and that any type of switching as is known in the art, whether or not fully contained within earpiece 28, may be used in place of first portion 30 and second portion 32 as illustrated in FIG. 2. However, for clarity and simplicity, FIG. 2 is illustrated with an actuator comprising first portion 30 and second portion 32.

FIG. 3 illustrates a side view of the wireless telephone handset of FIG. 1 with the flip portion 14 closed, and mated with the body portion 12. As can be seen in FIG. 3, the two portions 30, 32 of the actuator mate when the flip portion 14 is closed. Volume control keys 36 may also be provided on one surface of the handset 10.

A top view of the handset 10 of FIGS. 1 and 3 is shown in FIG. 4. As is shown in this Figure, some embodiments include a power key 40 in the surface 20 of the handset. This positioning of the power key provides the advantage of easy accessibility for the user. This is especially true for handsets which are being carried by the user in a belt-type carrying holster (not shown), as the power key 40 is positioned on an exposed surface of the handset 10. In such a carrying holster, the power key 40 would look down at surface 20 and see power key 40. In some embodiments, the power key 40 is a momentary contact switch such as a membrane switch as is known in the art. The present invention is not limited to the type of keyswitch used.

It may be noted, however, that an exposed power key 40 is prone to inadvertent activation. Accordingly, some embodiments of the handset 10 may incorporate a recessed portion 42, illustrated in both FIGS. 4 and 5, in which the power key 40 is situated. This recess 42 provides one form of protection against inadvertent power key actuation. It should be noted that although FIGS. 4 and 5 illustrate various views of the wireless telephone handset 10 of FIG. 1, they are equally applicable to non-flip style wireless telephones, such as the sliding earpiece example illustrated in FIG. 2, as well as other types of wireless handsets as are known in the art.

Figure 6:
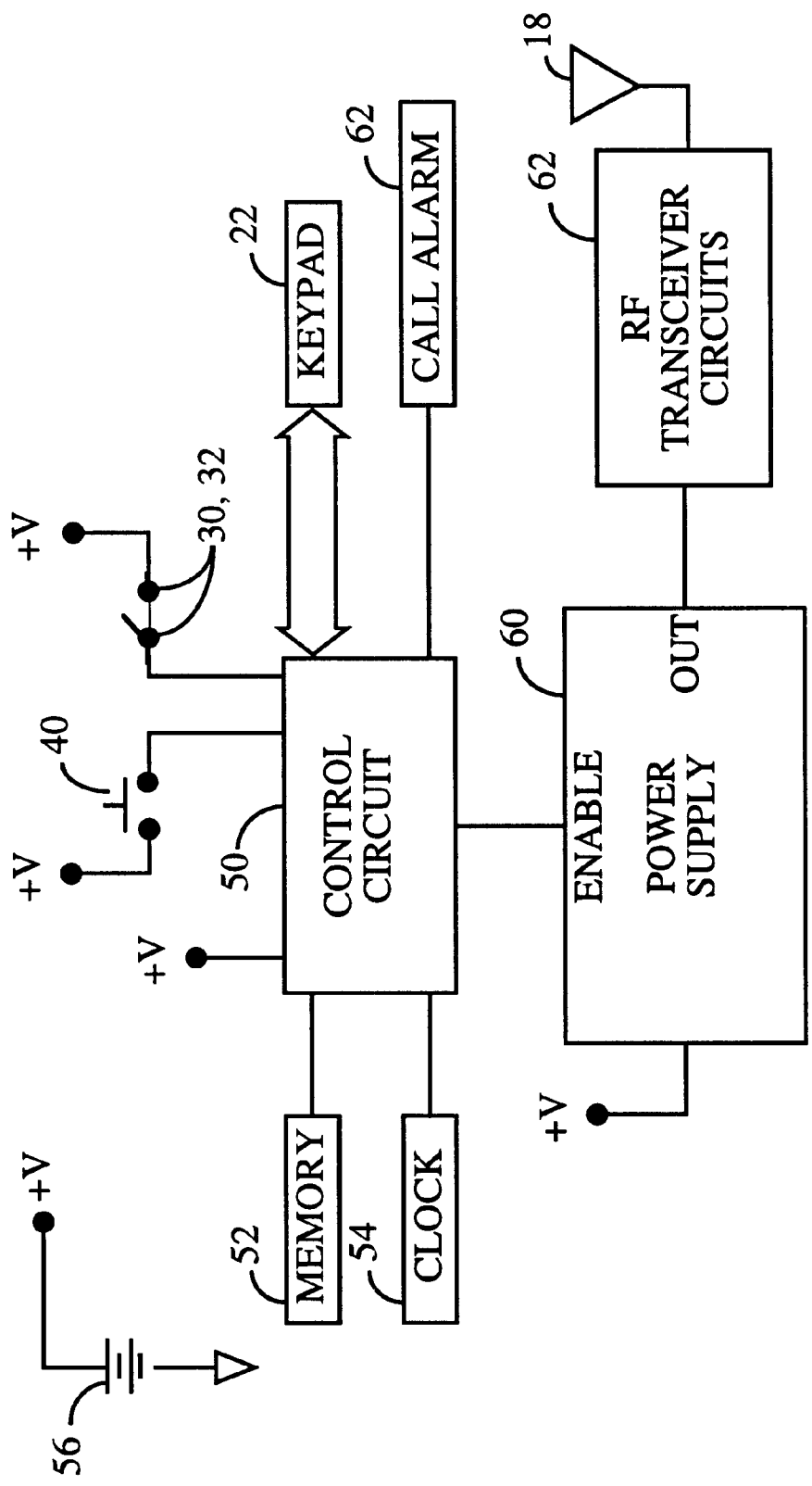
FIG. 6 is a block diagram of a portion of the circuitry of the cellular telephone handset of FIG. 3.

Referring now to FIG. 6, it can be seen that the power key 40 and the actuator switch 30, 32 each provide one input to a control circuit 50 inside the handset 10. The control circuit 50 also interfaces with a memory 52, which may comprise both ROM and RAM, the keypad 22, and a clock 54. Further provided inside the handset 10 is a battery 56, which provides an energy source for the entire handset 10. The control circuit 50 also interfaces with a power supply circuit 60 which supplies appropriate voltage and current levels to one or more RF transceiver circuits 62 that drive the antenna 18. In some advantageous embodiments of the present invention, the power supply circuit 60 is turned on and off via an enable signal from the control circuit 50. The control circuit 50 further controls a call alarm circuit 62, which alerts the user to an incoming telephone call via an audible, visual, or tactile signal as are known in the art.

It can be appreciated that many variations to the circuitry illustrated in FIG. 6 may be created and are currently familiar to those of skill in the art. In many embodiments, the control circuit 50 will comprise one or more. appropriately programmed microprocessors or microcontrollers. In addition, many possible interconnections are not illustrated. For example, in addition to the RF transceiver circuits 62, the keypad 22 and/or the display 24 may be powered by the power supply 60, as may be portions of the control circuit 50 itself. Furthermore, the power key 40 and actuator switch 30, 32, may interface with the control circuit in a variety of ways. In conjunction with FIGS. 7 through 10 below, the functions performed by the control circuit 50 and the associated circuitry of the handset 10 are described. Given the description herein, those of skill in the art will be readily able to design hardware and associated programming to implement those functions.

Figure 7:
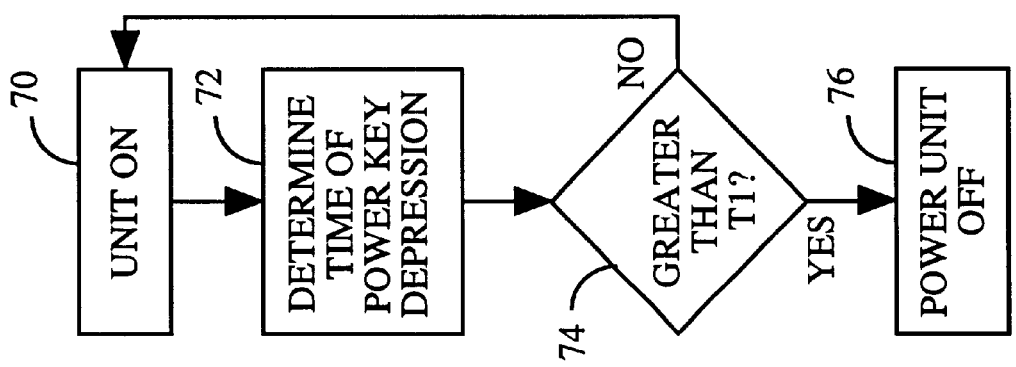
FIG. 7 is a flowchart of a portion of the actions performed by a cellular telephone handset in one embodiment of the present invention.

As mentioned above, the power key 40 may be situated in a recessed portion 42 of the handset housing to help prevent inadvertent actuation. It is advantageous, however, to take additional protective measures. Thus, some embodiments of the handset incorporate a sensing system which allows the phone to ignore momentary power key actuation if the time period for which the power key was depressed is shorter than a predetermined time period. FIG. 7 illustrates the steps performed by a communication device, such as, for example, the cellular telephone handset of FIGS. 1 through 5, which operates so as to ignore short duration depressions of the power key. In this Figure, the unit is assumed to begin the sequence on the "on" state 70, and is performing its normal supervisory and control functions as are typically performed by a wireless telephone handset. If the power key 40 is depressed, circuitry inside the handset determines the time period of the power key depression at step 72.

This may be accomplished in many ways. For example, a timer using clock 54 may be started when the power key is initially depressed, and stopped when the power key 40 is released. In many currently implemented wireless telephone systems, the wireless telephone handset periodically receives an absolute time reference from the cell sites (not shown) with which it communicates. In these cases, the duration of power key 40 depression may be determined by noting the time at which the power key 40 was depressed and comparing it to the time at which the power key 40 was released. Clearly, many ways of determining the duration of power key 40 depression may be used by one skilled in the art without departing from the present invention.

Regardless of how the duration of power switch depression is determined, at step 74 the time is compared to a predetermined time, denoted "T1" in FIG. 7. At step 76, if the time of power switch depression is greater than T1, the unit is powered off. On the other hand, if the time of power switch depression is less than T1 at step 74, the control circuit 50 ignores the power key 40 actuation and returns to the initial normal supervisory and control routine at step 70. It can be appreciated that this sequence provides additional protection against inadvertent power down of the handset because short duration power key actuation, as might occur accidentally, is ignored by the system.

Figure 8:
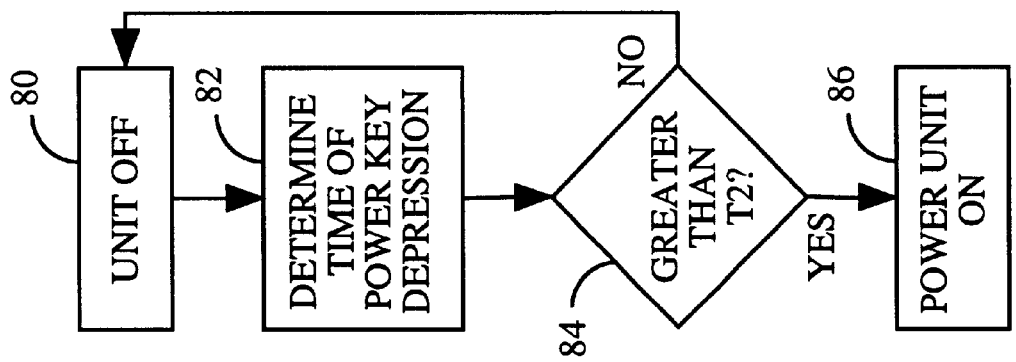
FIG. 8 is a flowchart of a portion of the actions performed by a cellular telephone handset in one embodiment of the present invention.

It can further be appreciated that the same type of sequence can be performed when the handset is initially in the off state. This is illustrated in FIG. 8. In this case, in contrast with FIG. 7, the handset 10 begins the sequence at step 80 in the off state. At step 82, in analogy with FIG. 7, the unit determines the time of power key 40 depression for the actuation of the power key 40. Of course, this requires that some circuitry remain operational even when the unit is "off", as that term is used herein. The "off" state as used herein may also be termed a "sleep" mode, in that the RF transceiver circuitry 62, keypad 22, and many other circuit components are not powered in this state, but some of control circuitry 50 remains powered by the battery 56 to perform a limited set of housekeeping functions, such as monitoring the state of the power key 40.

At step 84, the time of power key 40 depression is then compared to a predetermined time period denoted "T2". If the time of power key 40 depression is less than T2 at step 84, the control circuit 50 ignores the power key 40 actuation and returns to the initial off state (or sleep state) housekeeping routine at step 80. It may be pointed out that this time period T2 may be either different from, or the same as, T1 of FIG. 7 in the same wireless telephone handset.

A significant additional feature of some embodiments of the present invention is that once circuitry for determining the time of key depression is implemented in a wireless telephone handset, it is possible to include additional functionality in that key. For example, a wireless telephone handset may be created which performs a first function when a key is depressed for a first period of time, and a second function when the key is pressed for a second period of time. A specific example of such a cellular telephone handset is illustrate in FIG. 9.

Figure 9:
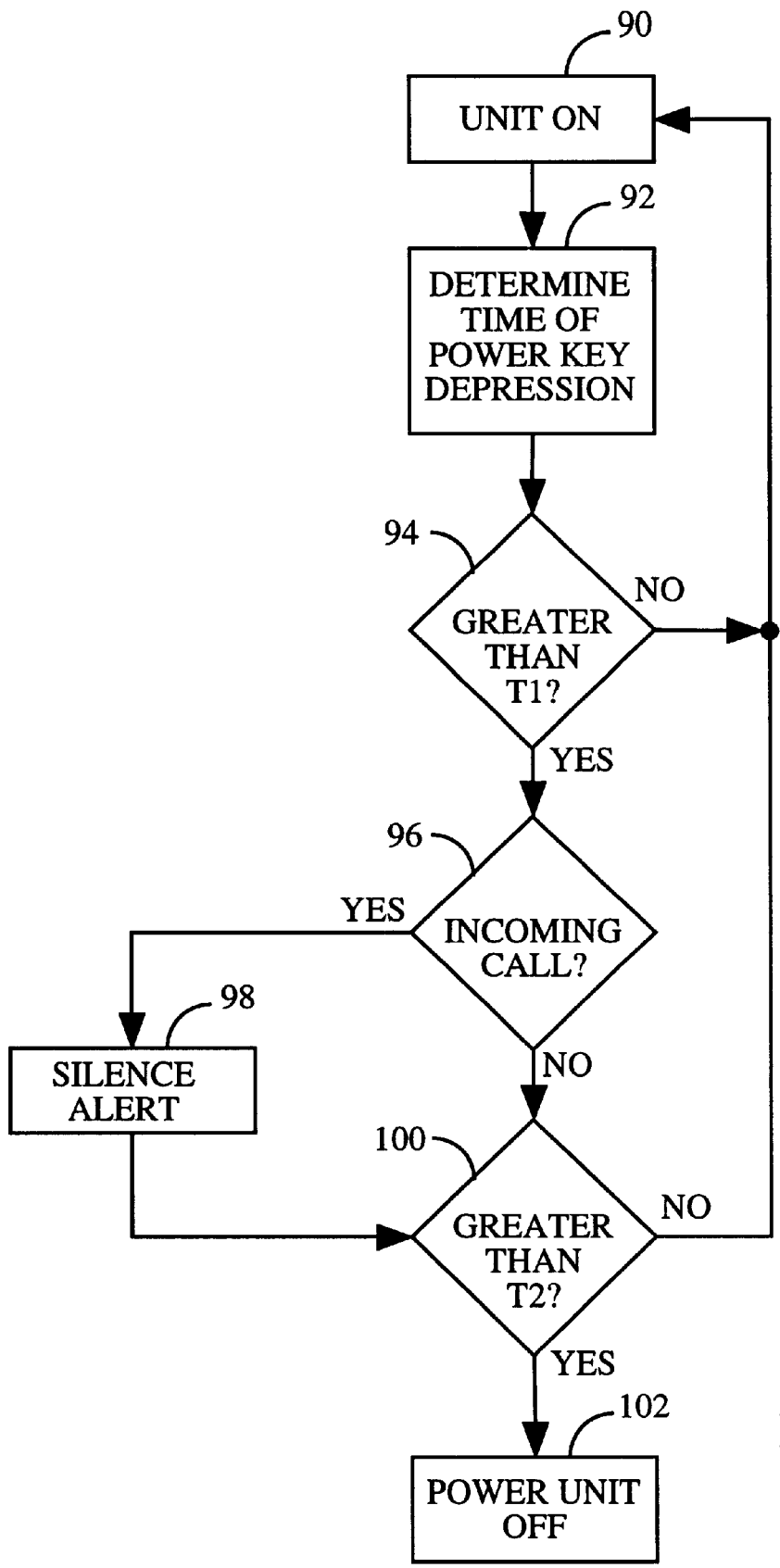
FIG. 9 is a flowchart of a portion of the actions performed by a cellular telephone handset in one specific embodiment of the present invention incorporating a multifunctional power switch.

FIG. 9 illustrates a sequence of functions performed by a wireless telephone handset, such as wireless telephone handset 10 of FIG. 1, which incorporates a power on/off function with an incoming call alarm silencing function. In this specific embodiment, at step 90 the handset begins the sequence of FIG. 9 in the "on" state, as the handset 10 can typically only provide an incoming call alarm to a user if the handset is powered on when an incoming call is received.

At step 92, the unit determines the time of power key depression in a manner similar to that described above with respect to FIGS. 7 and 8. At step 94, the handset control circuitry then compares the time of power key depression with a first pre-determined time T1. If the time of power key depression was less than the time T1, the handset returns to the normal supervisory and control routine at 90. At step 96, if the time of power switch depression is greater than T1, the handset checks for the presence of an incoming call. If there is an incoming call, the alert feature of the handset will have been activated, and at step 98 the handset will silence the alert. After silencing the incoming call alert, or if no incoming call is present at that time, at step 100 the handset will then compare the time of power switch depression to a second predetermined time T2, which in many embodiments will be longer than the first predetermined time T1. If the time of power switch depression is less than time T2, the handset again returns to the normal supervisory and control routine at 90. However, if the time of power switch depression is greater than time T2, at step 102 the handset powers off. In this way, a single key performs both an incoming call alert silencing function and a power off function. As described above, this key may be left accessible to the user, and may therefore be conveniently available to the telephone user but still protected from accidental actuation by the fact that key actuations having a duration less than both T1 and T2 do not trigger the handset to perform any function.

Figure 10:
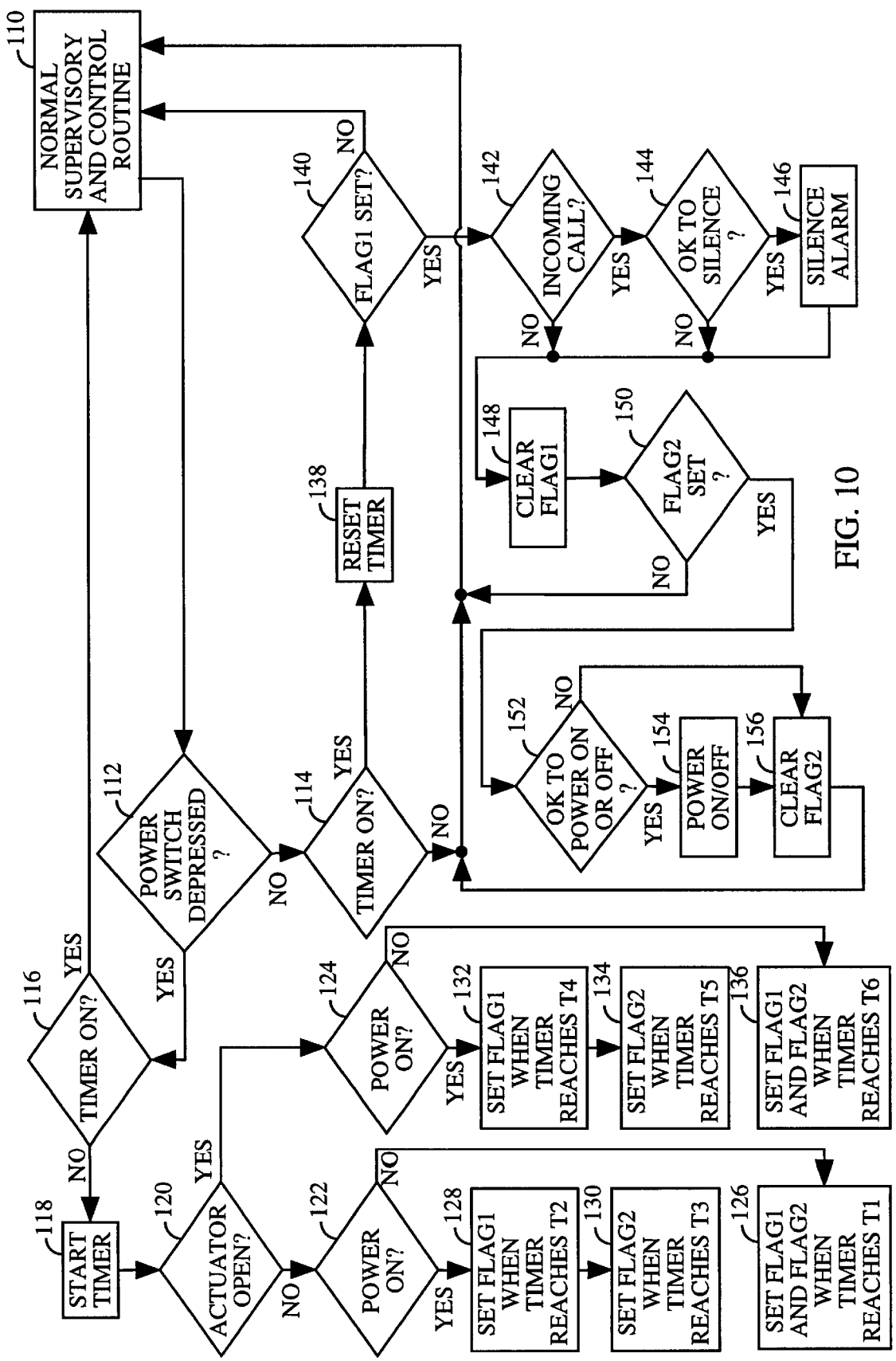
FIG. 10 is a flowchart of a portion of the actions performed by a cellular telephone handset in another specific embodiment of the present invention incorporating a multifunctional power switch.

A more detailed flowchart of the functions performed in one possible embodiment of a cellular telephone handset is illustrated in FIG. 10. In the system illustrated in this Figure, a timer is used to set a first flag after a power key 40 on the handset 10 is depressed for a selected period of time. If the power key 40 remains depressed for an additional selected period of time, a second flag is set. The control circuit 50 of the handset 10 monitors the status of these flags, and performs different functions depending on which, if any, of the two flags are set.

Referring now to FIG. 10, at step 110 the handset 10 may initially be in either the "on" or "off" state, performing its normal supervisory and control routine. In the handset embodiment described by FIG. 10, the control circuitry 50 in the handset detects the status of the power key 40 (as well as the keys on the keypad 22) at step 112 to determine whether or not the key is depressed at that moment. The hardware of the handset described by FIG. 10 also includes a timer circuit which may be part of clock 54 for timing the period of power switch depression.

Following step 112 and the determination of whether or not the power key is depressed when detected by the control circuitry 50, at steps 114 or 116 the handset control circuit 50 also checks whether or not the timer is running. If the power key 40 is not depressed at step 112, and the timer is also not running at step 114, it means that no recent power key actuation has occurred, and the handset returns to the normal supervisory and control routine at 110. However, if the control circuit determines that the power key is depressed at step 112, and that the timer is not on at step 116, it indicates that the power key was depressed, and accordingly at step 118 the timer is started to time the duration of power key 40 depression.

If at step 112 the control circuit 50 determines that the power key 40 is depressed, and at step 116 determines that the timer is on, this indicates that timer initiation at step 118 must have been performed after a previous detection of the power key 40, and that the power key 40 remains depressed. In this instance, the handset again returns to the normal supervisory and control routine at 110, effectively to await power key 40 release, as is described in more detail below. Thus, in this specific embodiment, the handset will start the timer shortly after the power switch is initially depressed, and will remain in the loop defined by steps 110, 112, and 116 without performing any power key related functions as long as the power key 40 remains depressed. Additionally, as long as the power key 40 has not been actuated and the timer remains off, the handset remains in the loop defined by steps 110, 112, and 114 and again no power key 40 related functions are performed.

After the timer is started at step 118, the handset makes a determination of two additional things. First, at step 120 it determines whether or not the actuator, which may comprise, for example, a flip or slidable earpiece as illustrated in FIGS. 1 and 2, is open or closed. Second, at either step 122 or 124, the control circuit 50 determines whether it is currently in the on or the off state.

If the actuator is closed and the unit is in the off state, at step 126 the control circuit 50 will set two flags, denoted FLAG1 and FLAG2 in FIG. 10, when the timer reaches a first predetermined time T1. If the actuator is closed and the handset is in the on state, at step 128 the control circuit 50 will set FLAG1 when the timer reaches a second predetermined time T2, and at step 130 will set FLAG2 when the timer reaches a third pre-determined time T3. As will be discussed in more detail below, when FLAG1 is set, it indicates that any incoming call alert should be silenced. When FLAG2 is set, it indicates that the unit should be powered on if it is currently off, or powered off if it is currently on. It may be noted that if the unit is off, no incoming call alert can be initiated, and it is therefore unnecessary to set FLAG1 and FLAG2 at different times when the unit is initially in the off state.

As is also illustrated in FIG. 10, if the actuator is open and the unit is in the on state, at step 132 the handset will set FLAG1 when the timer reaches a fourth pre-determined time T4, and at step 134 will set FLAG2 when the timer reaches a fifth pre-determined time T5. If the actuator is open and the unit is in the off state, at step 136 the handset will set FLAG1 and FLAG2 when the timer reaches a sixth predetermined time T6.

Of course, the six different pre-determined time periods T1 through T6 can be independently set to define delay times which will be convenient for the user while still helping to prevent inadvertent handset functions from occurring and allowing the power key to initiate two separate functions at the discretion of the user. It may, for example, be advantageous to have the time periods T4, T5, and T6 be shorter than the time periods T1, T2, and T3. In these embodiments, the delay times are greater when the actuator is closed, and therefore when the handset is likely being stored away in a pocket or holster. It is, of course, preferable to have T2 and T4 be shorter than T3 and T5 respectively, as this allows a short duration power key 40 depression to initiate one function, while a longer power key 40 depression initiates another function.

As is also illustrated in FIG. 10, FLAG1 and FLAG2 are used to selectively initiate handset functions after the power key 40 is released. If at step 112 the control circuit 50 notes that the power key 40 is not depressed, and at step 114 further notes that the timer is on, this indicates that the power key 40 has been depressed, the timer has been initiated, and that the power key 40 has now been released. In this situation, at step 138 the control circuit 50 will reset the timer to zero. At step 140 the control circuit 50 will then check the status of FLAG1. If FLAG1 has not been set, this indicates that the timer never reached any of times T1 through T6, and that the duration of power key 50 depression was sufficiently short that the power key 50 depression should be ignored. The handset therefore maintains its current state, returning to the normal supervisory and control sequence at 110.

If FLAG1 has been set, the control circuit 50 determines, at step 142, whether or not an incoming call is being received such that an incoming call alert has been initiated. If no incoming call is being received, at step 148 FLAG1 is cleared. If an incoming call is being received, at step 144 the control circuit 50 may then check other parameters to determine if the alert should be silenced. These other parameters could include the expiration of another defined waiting period or the presence of some other mode of operation which is intended to inhibit the silencing of incoming call alerts. If the handset determines that the alert may be silenced, it does so at step 146, and at step 148 clears FLAG1. If the control circuitry determines that the alert should not be silenced in spite of the status of FLAG1, the alert silencing step 146 is skipped, and at step 148 FLAG1 is cleared as before.

After clearing FLAG1 at step 148, at step 150 the control circuitry 50 checks the status of FLAG2. If FLAG2 has not been set, this indicates that the time of power key 50 depression was sufficient to set FLAG1 but not FLAG2, and that therefore the power on/off function of the key should not be performed. Accordingly, if FLAG2 is not set, the control circuitry returns to the normal supervisory and control routine at 110. If FLAG2 has been set, this indicates that the time of power key depression was sufficient to set FLAG2, and at step 152 the control circuitry 50 may then check other parameters to determine if the unit should change its on/off state at that time. For example, the control circuitry 50 may be configured to prevent a change in the on/off state of the unit if one of the keypad buttons is currently being depressed. If the control circuitry 50 determines that it may change the on/off state. at that time, at step 154 the handset is powered off if it is initially in the on state, or powered on if it is initially in the off state. At step 156 FLAG2 is then cleared, and the control circuitry 50 returns to the normal supervisory and control routine at 110. If the control circuitry 50 determines that the handset on/off status should not be changed, step 154 is skipped, FLAG2 is cleared, and again the control circuitry 50 returns to the normal supervisory and control routine at 110.

It will be appreciated that many different sequences of steps and hardware for performing those steps can be utilized to take advantage of the benefits of the present invention. As mentioned above, many different methods of determining the time of power key 40 depression may be implemented. In some advantageous embodiments, the control circuitry 50 can be configured to immediately respond to the timer reaching certain predetermined values, rather than waiting for the power key 40 to be released as in the embodiment of FIG. 10. Furthermore, the timing of the duration of power key 40 depression could be implemented as part of the program controlling a microprocessor or microcontroller in the handset, or could comprise separate circuitry providing signals that are interpreted by a programmed microprocessor or microcontroller in the handset. Different implementations will have different advantages in various designs of wireless telephone handsets, and those of skill in the art will be readily able to design hardware and/or software which provides the features of the invention described above and which works efficiently with the specific wireless telephone handset being created.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A communication device having a multiple function keyswitch, the communication device comprising:

a power key;

a body portion having a front surface, a back surface, and a top surface, said front surface having a user interface thereon said power key disposed on said top surface;

a moveable flip portion secured to said body portion by a hinge at said top surface of said body portion, said moveable flip portion covers said user interface when in a closed position, and wherein said power key is exposed when said moveable flip portion is in said closed position; and a control circuit, coupled to said power key, for sensing an actuation of said power key, and for silencing an alert in response to said actuation of said power key if a duration of said actuation is greater than a first predetermined time period, and for powering said communication device on or off if said duration of said actuation is greater than a second predetermined time period.

2. The communications device of claim 1 wherein said power key is located within a recess in said top surface.

* * * * *